United States Patent [19]

Puzey et al.

[11] Patent Number: 5,435,479
[45] Date of Patent: Jul. 25, 1995

[54] CYLINDER ROUNDING AND CLAMPING FIXTURE FOR WELDED JOINTS

[75] Inventors: Nathan S. Puzey, Lynchburg; Mark Lehmann, Forest, both of Va.; Timothy J. Haynie, South Bend; Keith M. Wing, Evansville, both of Ind.

[73] Assignee: The United States of America as represented by the National Aeronautics and Space Administration, Washington, D.C.

[21] Appl. No.: 268,908

[22] Filed: Jun. 29, 1994

[51] Int. Cl.⁶ ............................................. B23K 37/053
[52] U.S. Cl. ............................... 228/44.5; 228/49.3
[58] Field of Search ................ 228/173.4, 212, 44.5, 228/48, 49.3

[56] References Cited

U.S. PATENT DOCUMENTS

| | | | |
|---|---|---|---|
| 3,699,635 | 10/1972 | Bradley et al. | 228/44.5 |
| 3,741,457 | 6/1973 | Gwin et al. | 228/44.5 |
| 4,164,135 | 8/1979 | Clavin | 72/466 |
| 4,177,914 | 12/1979 | Clavin | 228/49.3 |
| 4,233,020 | 11/1980 | Oswald | 425/471 |
| 4,337,932 | 7/1982 | Dennis et al. | 269/23 |
| 4,436,574 | 3/1984 | Long et al. | 156/415 |
| 4,483,477 | 11/1984 | Eckold et al. | 228/42 |
| 5,285,947 | 2/1994 | Depperman | 228/49.3 |

*Primary Examiner*—Samuel M. Heinrich
*Attorney, Agent, or Firm*—Robert J. Edwards; D. Neil LaHaye

[57] ABSTRACT

A weld joint round tool. A heavy walled central mounting ring has a mounting plate joined thereto that forms the foundational structure to which all of the moving parts are anchored. Rounding/clamping is performed by twenty-four simultaneously activated shoes that are connected by linkage arms to a central actuator ring. The shoes are expanded or retracted by rotating the actuator ring, which in turn pushes or pulls on each linkage. The ring is rotated by an AC servo motor linked to a gear reducer, the output of which drives a stationary pinion gear to move a rack mounted on the actuator ring. The weld joint round tool is mounted on the end of a cantilevered mandrel structure, which is inserted into the cylinders to be welded. Once the tool is positioned at the joint between the two cylinders, the shoes are expanded to clamp the inner diameter of the two cylinders so that welding can take place.

19 Claims, 4 Drawing Sheets

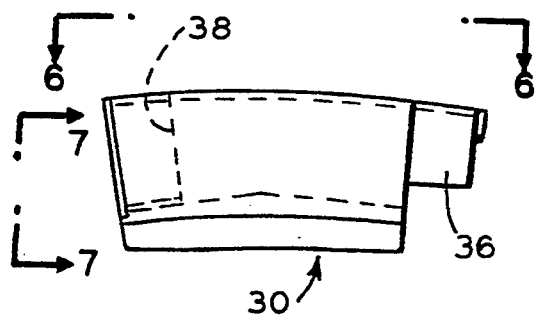
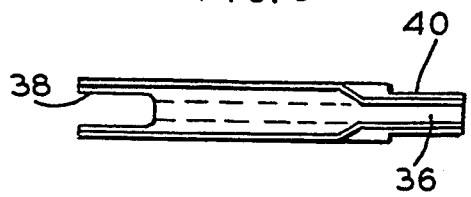
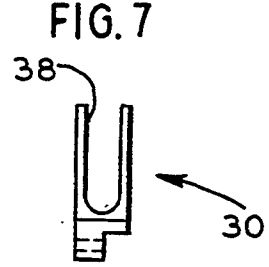
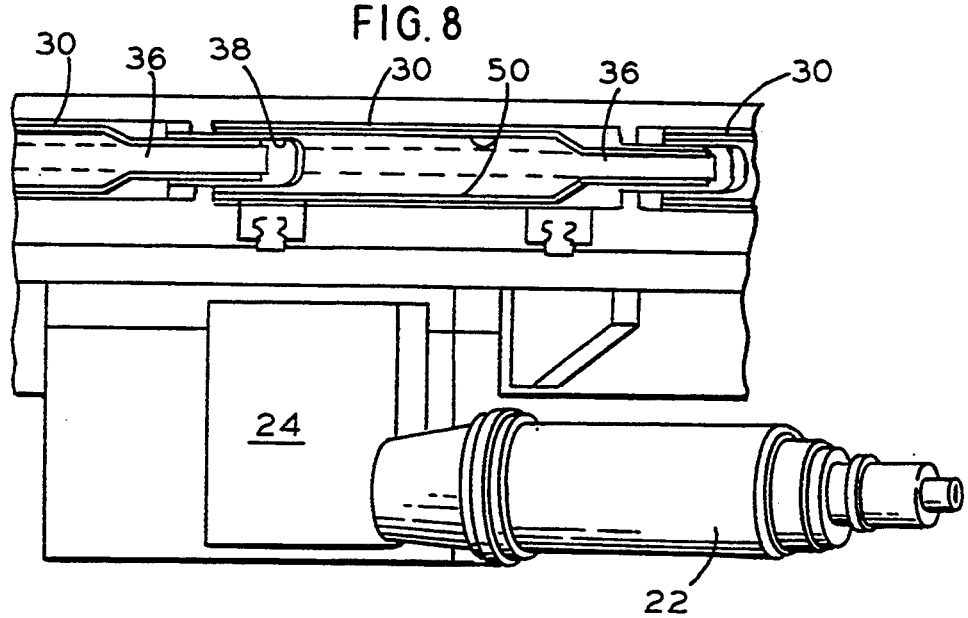

CYLINDER ROUNDING AND CLAMPING FIXTURE FOR WELDED JOINTS

BACKGROUND OF THE INVENTION

1. Field of the Invention

The invention is generally related to welding of two cylinders together and more particularly to the clamping, aligning, rounding and welding of large diameter cylinders together.

2. General Background

Various methods exist to align and clamp two cylinders for welding. Several methods use multiple shoes to apply force to the inside diameter of each of the cylinders to be welded. Details of some of these methods are as follows.

Shoes consisting of arc segments are machined to match the inner diameter of the cylinders to be welded. These arc segments are welded together to create a U-shaped channel, creating a back purge chamber between the two clamping segments. The arc segments are manually positioned and then held in place by a spoked arrangement. Force is applied to the segments by tightening nuts which run on threaded rods in the spokes. Gaps between the segments and the cylinders must be caulked (e.g. silicon (RTV) in order to prevent the back purge gas from leaking out. This equipment is very time consuming to install, is not very accurate, and the risk of damaging the component is high.

A wheel hub is positioned inside the cylinders. Multiple shoes are inserted between the hub and the cylinder. In between the shoes and the hub is a fire hose, which is then pressurized with air to provide the necessary force to clamp and round the cylinders. Since shoe position is dependent on uniform inflation of the fire hose, alignment of the shoes is not very accurate. This method does not provide a closed chamber for back purging.

Rather than use in a curved shoe against the cylinder, another method uses a series of swivel-headed bolts to push on the inner diameter of the cylinder. The bolts are anchored into an arc segment, which is moved into rough position by motor driven screw jacks. After the arc segments are positioned close to the cylinder inner diameter, each of the bolts is manually adjusted to provide the proper force on the inner diameter of the cylinder. This method is very time consuming and does not provide accurate fit-up since the cylinder can flex in the area between the push bolts.

Some other methods do not employ shoes of any kind. For example, struts can be fabricated from pipe or tubing material, and forced into the inner diameter of the cylinder. This method is best suited to heavy walled cylinders that readily retain their own shape and for applications where a high degree of accuracy is not required.

Another method is to use consumable inner diameter rings which are machined to provide an interference fit with the inner diameter of the cylinders. The rings are shrunk into the inner diameter of the cylinders, and provide internal rounding pressure as they expand. The rings would then be cut apart to remove them from the cylinder.

The inventors are not aware of an existing tool design that satisfies al of the following design requirements for making circumferential welds in large diameter cylinders. Because fit-up of the cylinders is critical to control both weld quality and to meet final dimensional requirements for the cylinder assemblies the tool must permit almost perfect alignment of the cylinders to be joined and allow the cylinders to be anchored on location to maintain alignment during rolling and welding. To correct cylinder out-of-roundness within 0.010 inch, mismatch must be essentially eliminated in order to achieve proper fit-up. The tool must provide sufficient in/out stroke length to provide clearance with cylinder inner diameter features at the small diameter (retracted position) and long enough to effectively apply force to the inner diameter of the cylinders. Clamping force should be selectable and displayed for the operator. Tooling located near the welding arc must be fabricated from non-magnetic materials in order to prevent disturbance of the welding arc (known as "arc blow"). The material must also be able to withstand the heat from the welding operation. It must be possible to create a sealed back purge chamber to be flooded with an inert gas to prevent oxidation of the backside of the weld. An electrical grounding path must be provided for the welding arc. The tooling must be symmetrical and balanced for proper rotation during welding. The design must allow proper installation, use, and removal without scratching or marring the final machined cylinder surfaces.

SUMMARY OF THE INVENTION

The invention addresses the above need. What is provided is a cylinder rounding and clamping fixture for holding two cylinders together while they are welded together. A central mounting ring has a mounting plate joined thereto to form the foundational structure. An actuator ring is rotatably received on the mounting plate. A number of U-shaped shoes are connected by linkage arms to the actuator ring for radial movement of the shoes in response to rotation of the actuator ring. The actuator ring is rotated by a servo motor linked to a gear reducer which drives a stationary pinion gear to move a rack mounted on the actuator ring. Each shoe has a tongue extension on one and end and a groove on the opposite end for slidably receiving the tongue of the adjacent shoe. This allows sealing between shoes for retaining an inert gas in the hollow of the U-shape in the shoes during welding operations to prevent oxidation of the weld metal. Silicon seals are used at the interface between the outer diameter surface of the shoes and the inner diameter surface of the cylinders to be welded. A video camera is mounted in one of the shoes to provide a view of a small portion of the inner diameter of the weld joint. The fixture is mounted on the end of a cantilevered mandrel structure, which is inserted into the cylinders to be welded. Once the tool is positioned at the joint between the two cylinders, the shoes are expanded to clamp the inner diameter of the two cylinders so that welding can take place.

BRIEF DESCRIPTION OF THE DRAWINGS

For a further understanding of the nature and objects of the present invention reference should be had to the following description, taken in conjunction with the accompanying drawing in which like parts are given like reference numerals, and wherein:

FIG. 5 is a side view of a shoe of the invention.
FIG. 6 is a view taken along lines 6—6 in FIG. 5.
FIG. 7 is a view taken along lines 7—7 in FIG. 5.
FIG. 8 is a view taken along the outer circumference to illustrate the interlocking shoes.

DETAILED DESCRIPTION OF THE PREFERRED EMBODIMENT

Figure 1:
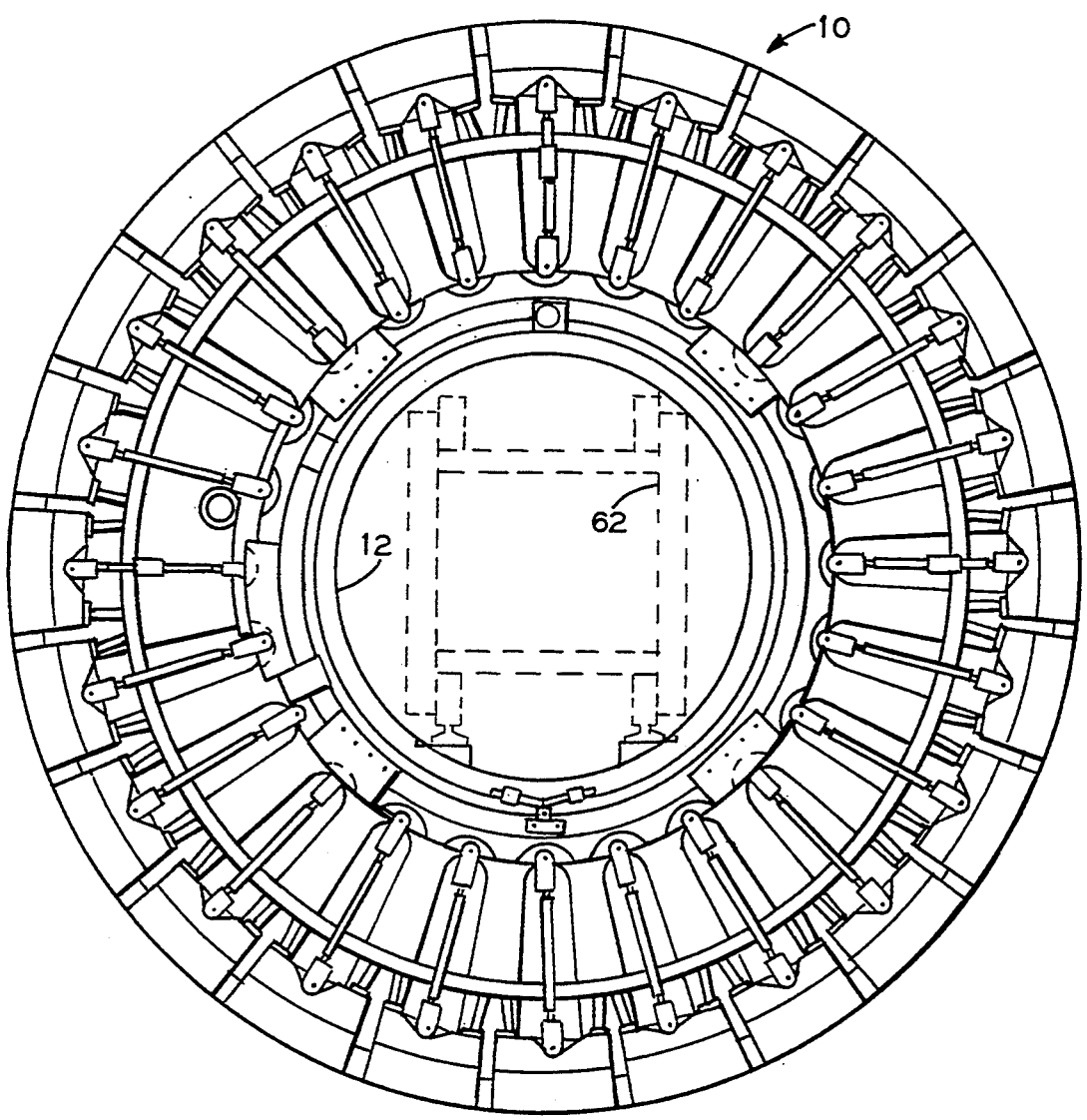
FIG. 1 is a front elevation view of the invention.

Referring to the drawings, it is seen in FIG. 1 that the invention is generally indicated by the numeral 10. Cylinder rounding and clamping fixture 10 is generally comprised of mounting ring 12, mounting plate 14, actuator ring 16, means 18 for causing rotation of actuator ring 16, and a plurality of rounding/clamping assemblies 20.

Figure 2:
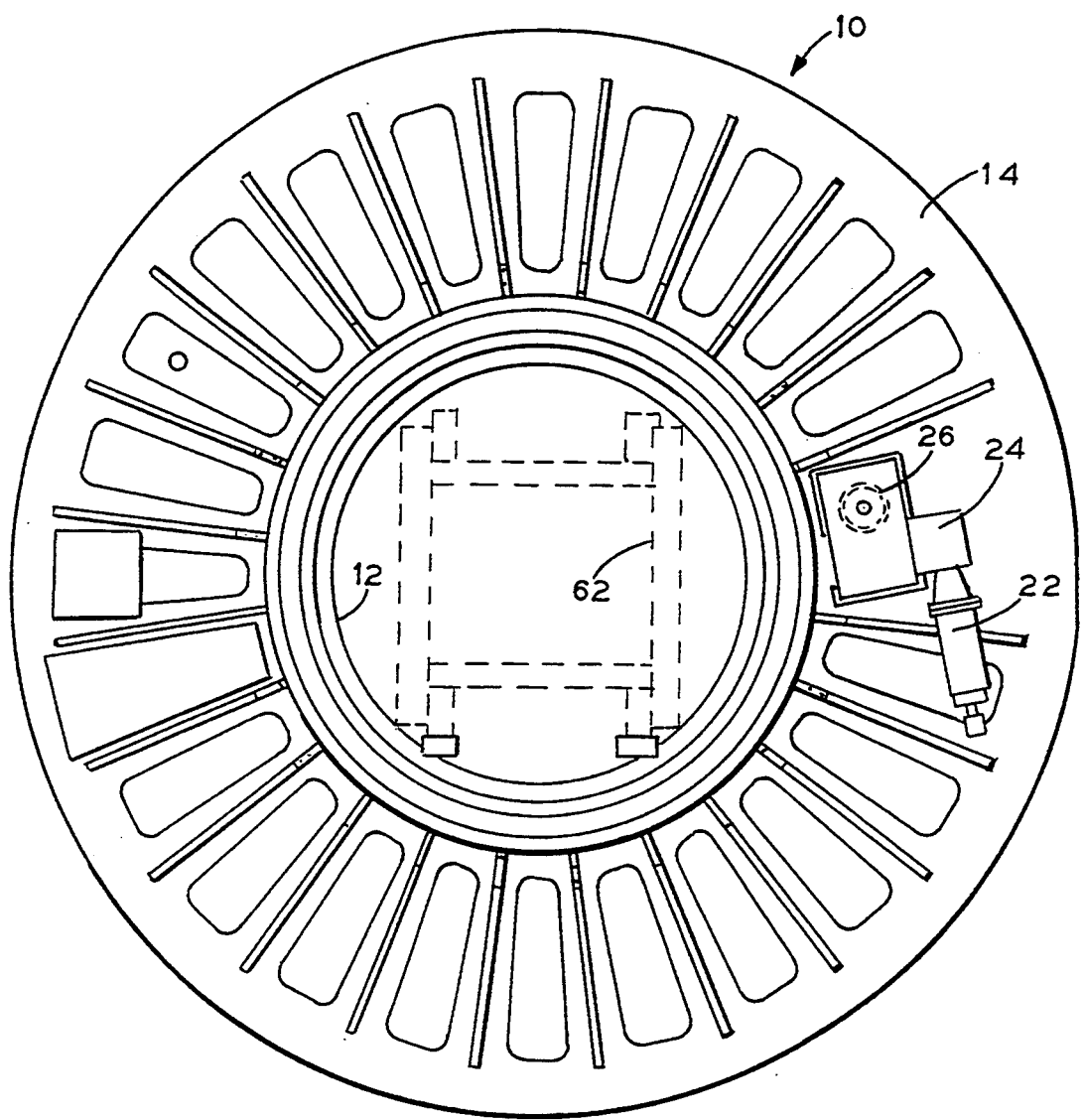
FIG. 2 is a rear elevation view of the invention.
Figure 4:
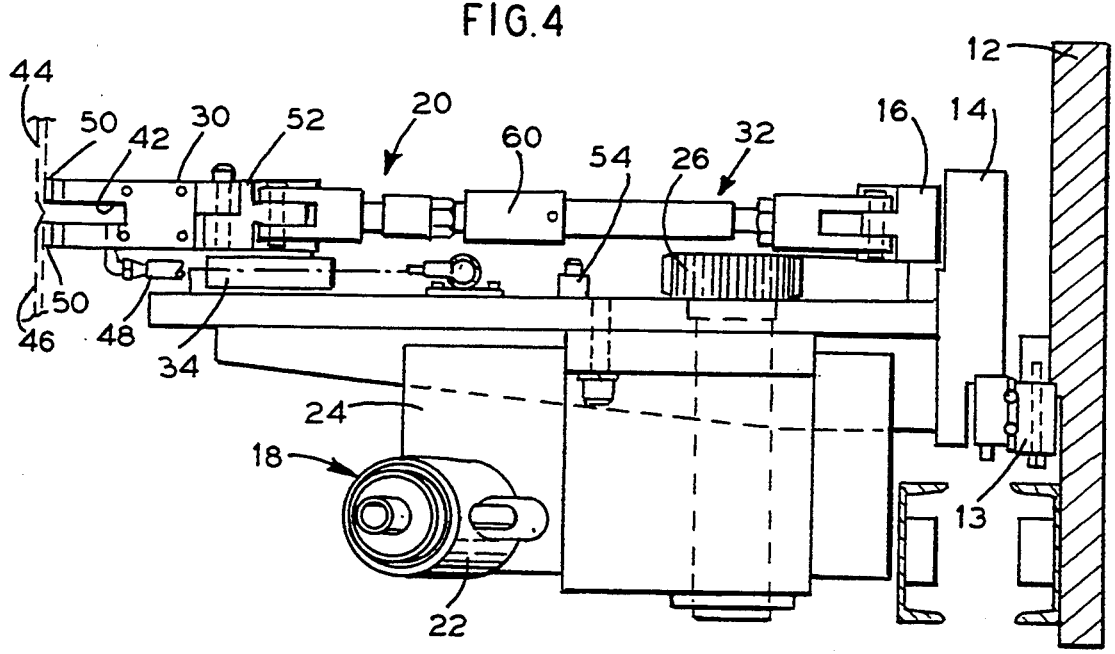
FIG. 4 is a side sectional view that illustrates a shoe assembly and the drive mechanism of the actuator ring.

As best seen in FIG. 4, mounting ring 12 is a heavy walled central mounting ring to which mounting plate 14 is attached by way of a large rotary bearing 13. Mounting plate 14 is substantially T-shaped in cross section, with the long portion of the "T" extending radially outward to form a circular plate as seen in the rear view of FIG. 2. Actuator ring 16 is concentric with and is rotatably received around the "T" of mounting plate 14.

Figure 3:
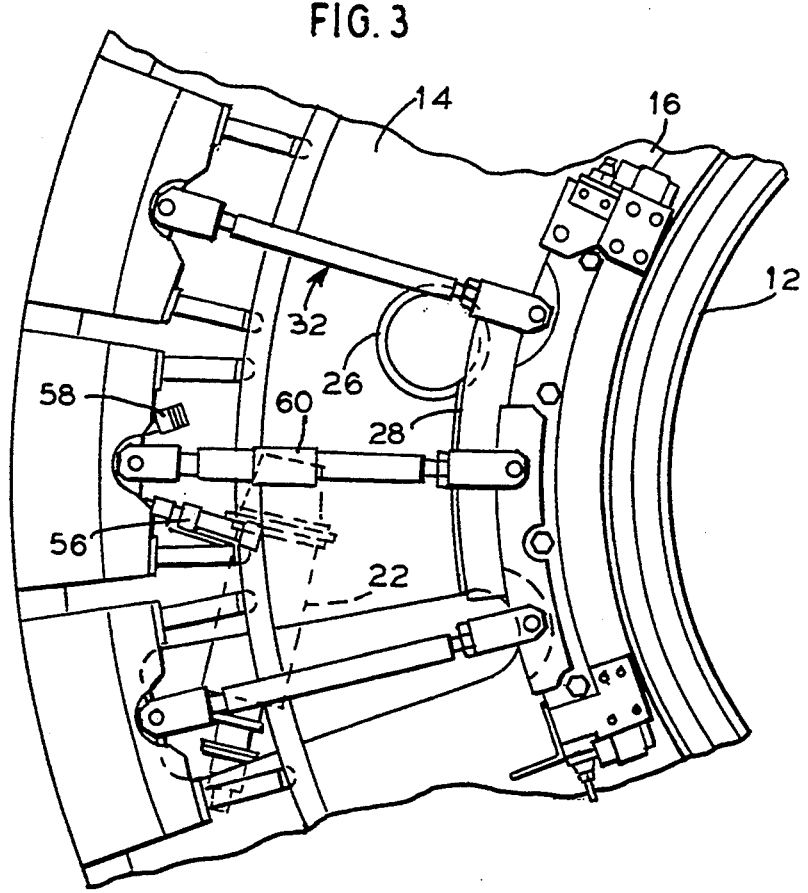
FIG. 3 is a detail front elevation view of the invention that illustrates the drive mechanism for the actuator ring.

Means 18 for causing back and forth rotation of actuator ring 16 is best seen in the side sectional view of FIG. 4 and in phantom view in FIG. 3. Means 18 is comprised of motor 22, gear reducer 24, pinion gear 26, and gear rack 28. Motor 22, gear reducer 24, pinion gear 26, are mounted on the long portion of the "T" on mounting plate 14 as best seen in FIG. 4. Gear rack 28 is rigidly attached to actuator ring 16. Motor 22 is preferably an AC servo motor which has its output engaged with gear reducer 24. Motor 22 preferably has an integral tachometer and is coupled with an encoder to provide computer controlled position and velocity information. Gear reducer 24, shown schematically, has its output engaged with stationary pinion gear 26. Gear reducer 24 is preferably a low-backlash cone drive gear reducer to prevent the gear rack from being back driven by the load on the shoes 30. This will cause the shoes to maintain position and exert force even if power to motor 22 is interrupted. Pinion gear 26 has its output engaged with gear rack 28. Thus, driving motor 22 results in rotary motion of actuator ring 16 relative to mounting ring 12 and mounting plate 14.

Each rounding/clamping assembly 20 is comprised of a shoe 30 and linkage 32 that is pivotally connected to actuator ring 16. One end of linkage 32 is pivotally attached to shoe 30 while the second end of linkage 32 is pivotally attached to actuator ring 16. As seen in FIG. 3, the structure of shoe 30 and actuator ring 16 is designed to limit the pivot range of linkage 32 to cause the radial outward and inward movement of shoe 30. The shoes 30 simultaneously align and restrain the cylinders to be joined by welding. Mismatch is closely controlled since the same shoe exerts force on both pieces to be joined. The linear guide bearings 34 provide smooth accurate radial motion and provide rigidity to prevent twisting of shoes and resulting mismatch. The shoes also force the cylinders back into roundness and on the centerline of rotation so that a constant torch-to-work distance can be maintained while the assembly is rotated for welding. It can thus be seen, as indicated in both FIG. 1 and 3, that rotation of actuator ring 16 in a first direction will cause pivoting of linkages 32 at actuator ring 16 to force shoes 30 radially outward while rotation of actuator ring 16 in a second direction will cause pivoting of linkages 32 at actuator ring 16 to radially retract shoes 30 as seen by the dotted lines of linkages 32. As seen in FIG. 4, the end of linkage 32 adjacent shoe 30 is attached to a linear bearing 34 that is slidably received on mounting plate 14.

Shoes 30 are provided with features directed specifically to clamping and welding of two cylinders together.

As seen in FIG. 5-8, each shoe 30 has a tongue and groove arrangement to provide for interlocking of shoes. Tongue 36 extends from one end and there is a complementary groove 38 at the opposite end sized to slidably receive the tongue from an adjacent shoe 30. This is illustrated in FIG. 8. A sealing surface 40 is provided on the interlocking ends of shoes 30 to provide a seal between shoes 30 for retaining a backpurge gas during welding operations. The interlocking shoes provide full contact with the cylinder internal diameter for accurate rounding of the cylinder being welded.

As seen in FIG. 4, each shoe 30 has a U-shaped slot 42 at the end facing the cylinders 44, 46 to be welded. Slot 42 serves the function of accommodating the welding arc plume and also serves as a backpurge gas chamber. Slot 42 is purged with an inert gas such as helium to prevent oxidation of the weld on the inner diameter.

The backpurge gas is provided to each shoe 30 through a fitting and gas line 48 from a central distribution manifold not shown. The central manifold provides a uniform supply of equal pressure gas to all of the shoes. Backpurge gas pressure is precisely controlled in order to provide the highest weld quality. Too much pressure displaces the molten weld metal while too little pressure allows oxygen from the atmosphere to contaminate the slot and oxidize the weld. A mass flow controller is used upstream of the manifold to precisely control the gas supply and pressure in the manifold is monitored by a pressure transducer. The controller reads the data from the pressure transducers and varies the flow rate in order to maintain a constant predetermined pressure. Any suitable material such as silicon seals 50 may be used on the end of slot 42, which represents the interface between the outer diameter surface of shoe 30 and the inner diameter of the cylinders to be welded. Silicon seals 50 are compressed as the shoes are expanded against the cylinder inner diameter and then expand to maintain a seal when the heat from welding creates a gap between the shoe and the cylinder due to localized expansion.

In order to obtain the best fit-up conditions and the best backpurge gas seal, it is imperative to match the shoe outside diameter with the cylinder inside diameter. Therefore, a modular assembly is used in the preferred embodiment that enables adaptation to various diameter cylinders. Shoe 30, stainless steel in the preferred embodiment, is attached to a carbon steel shoe base 52 which is attached to radial bearings 34 and linkage 32. Various cylinder diameters can be accommodated by attaching different shoe 30 sizes to shoe base 52. Grounding of the welding arc is accomplished through shoes 30 in a manner designed to handle high welding current with very minimal voltage drop. Every other shoe is wired to a central copper grounding ring 54. Rotation is accommodated by using brushes to transmit the current flow from the copper ring 54 to the heavy gage copper cables running to the welding power supply. This provides a consistent grounding path and limits adverse effects on the welding arc. Shoes 30 are preferably fabricated from non-magnetic stainless steel in order to prevent magnetic disturbance of the weld arc (known as "arc-blow").

A video camera 56 and light source 58, seen in FIG. 3, may be mounted at the bottom of the "U" in one of shoes 30 and serves three main purposes. First, it provides the operator with a view during equipment setup to confirm that shoes 30 are properly centered over the weld joint. Second, during welding of the first weld pass, the camera provides a view of the welding operation in progress. Third, the inner diameter of the resulting weld can be inspected prior to breaking down the tooling setup.

Four load cells 60, with one identified in FIG. 3, are mounted in line with four of the linkages 32 at ninety degree intervals. The load cells 60 provide data to the operator and are used to monitor rounding force to insure positive clamping, which is essential to contain the backpurge gas and to maintain a consistent electrical grounding path. The load cells also help prevent overloading and provide information to the welding operator so that rounding tool force can be maintained during welding (compensate for expansion of diameter due to the heat of welding).

In operation, mandrel 62 is used to insert cylinder rounding and clamping fixture 10 into the cylinders to be welded. Mandrel 62 is a cantilevered structure attached to mounting ring 12. Fixture 10 is positioned at the joint between the two cylinders and shoes 30 are moved radially outward as described above to clamp the inner diameter of the two cylinders. The backpurge gas is provided as described above and welding is accomplished. Confirmation of an acceptable may be made by use of video camera 56 before the fixture is unclamped and removed from the cylinders.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A cylinder and rounding and clamping fixture, comprising:
   a. a mounting ring;
   b. a mounting plate attached to said mounting ring;
   c. an actuator ring rotatably received on said mounting plate;
   d. means mounted on said mounting plate and said actuator ring for causing rotation of said actuator ring; and
   e. a plurality of rounding/clamping assemblies attached to said actuator ring and slidable relative to said mounting plate for radial movement relative to said mounting ring and mounting plate.

2. The fixture of claim 1, wherein said rounding/clamping assemblies comprise:
   a. a linkage pivotally attached at one end to said actuator ring; and
   b. a U-shaped shoe pivotally attached to the opposite end of said linkage.

3. The fixture of claim 1, wherein said means for causing rotation of said actuator ring comprises:
   a. a motor mounted on said mounting plate;
   b. a gear reducer mounted on said mounting plate and operatively engaged with said motor;
   c. a pinion gear mounted on said mounting plate and operatively engaged with said gear reducer; and
   d. a gear rack mounted on said actuator ring.

4. The fixture of claim 1, further comprising a load cell mounted in line with one of said rounding/clamping assemblies.

5. The fixture of claim 1, further comprising a video camera mounted on one of said rounding/clamping assemblies.

6. A cylinder and rounding and clamping fixture, comprising:
   a. a mounting ring;
   b. a mounting plate attached to said mounting ring;
   c. an actuator ring rotatably received on said mounting plate;
   d. means mounted on said mounting plate and said actuator ring for causing rotation of said actuator ring;
   e. a linkage pivotally attached at one end to said actuator ring; and
   b. a U-shaped shoe pivotally attached to the opposite end of said linkage whereby rotation of said actuator ring causes radial movement of said shoe relative to said mounting ring and said mounting plate.

7. The fixture of claim 6, wherein said means for causing rotation of said actuator ring comprises:
   a. a motor mounted on said mounting plate;
   b. a gear reducer mounted on said mounting plate and operatively engaged with said motor;
   c. a pinion gear mounted on said mounting plate and operatively engaged with said gear reducer; and
   d. a gear rack mounted on said actuator ring.

8. The fixture of claim 6, further comprising a load cell mounted in line with one of said rounding/clamping assemblies.

9. The fixture of claim 6, further comprising a video camera mounted on one of said rounding/clamping assemblies.

10. The fixture of claim 6, further comprising means for providing a gas into the "U" shape of said shoe assembly.

11. The fixture of claim 6, further comprising means for sealing said shoe assembly against the cylinder being rounded and clamped.

12. The fixture of claim 6, wherein said shoe assembly is provided with a tongue on one end and a groove on the other end for receiving the tongue of an adjacent shoe.

13. A cylinder and rounding and clamping fixture, comprising:
   a. a mounting ring;
   b. a mounting plate attached to said mounting ring;
   c. an actuator ring rotatably received on said mounting plate;
   d. means mounted on said mounting plate and said actuator ring for causing rotation of said actuator ring;
   e. a plurality of linkages each pivotally attached at one end to and equally spaced around said actuator ring; and
   b. a plurality of U-shaped shoes each pivotally attached to the opposite end of one of said linkages whereby rotation of said actuator ring causes radial movement of each of said shoes relative to said mounting ring and said mounting plate, each of said shoes being provided with a tongue on one end and a groove on the other end for receiving the tongue of an adjacent shoe.

14. The fixture of claim 13, further comprising seal means on the tongue and groove of said shoes for retaining gas in said shoes.

15. The fixture of claim 13, wherein said means for causing rotation of said actuator ring comprises:
   a. a motor mounted on said mounting plate;
   b. a gear reducer mounted on said mounting plate and operatively engaged with said motor;
   c. a pinion gear mounted on said mounting plate and operatively engaged with said gear reducer; and
   d. a gear rack mounted on said actuator ring.

16. The fixture of claim 13, further comprising a load cell mounted in line with one of said rounding/clamping assemblies.

17. The fixture of claim 13, further comprising a video camera mounted on one of said rounding/clamping assemblies.

18. The fixture of claim 13, further comprising means for providing a gas into the "U" shape of said shoe assembly.

19. The fixture of claim 13, further comprising means for sealing said shoe assembly against the cylinder being rounded and clamped.

* * * * *